Aug. 28, 1923.  
C. A. CLAFLIN  
1,466,119  
CONDUIT MEMBER FOR CONDUCTING FLUID UNDER PRESSURE  
Filed Sept. 8, 1922
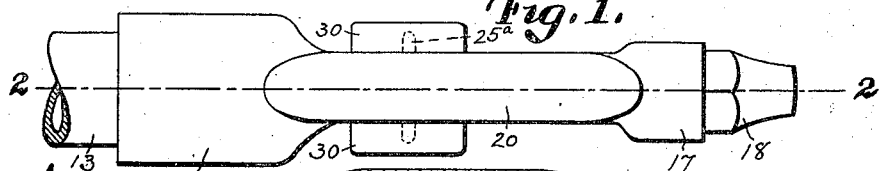
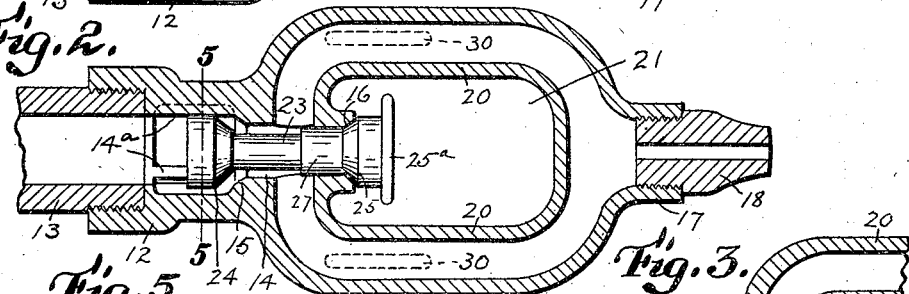
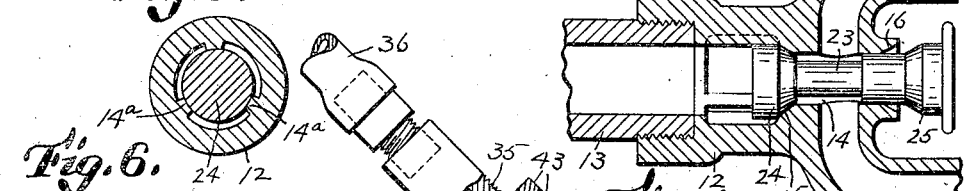
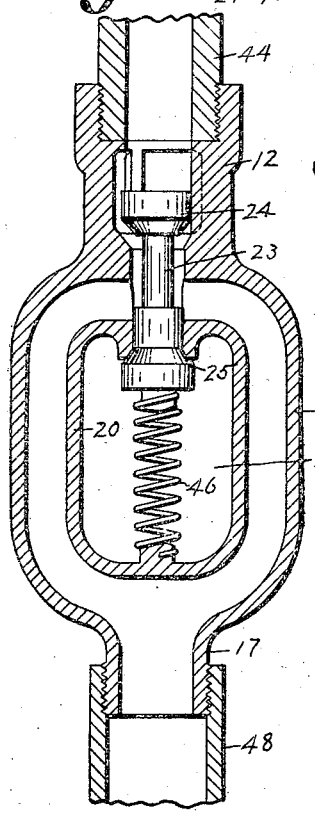
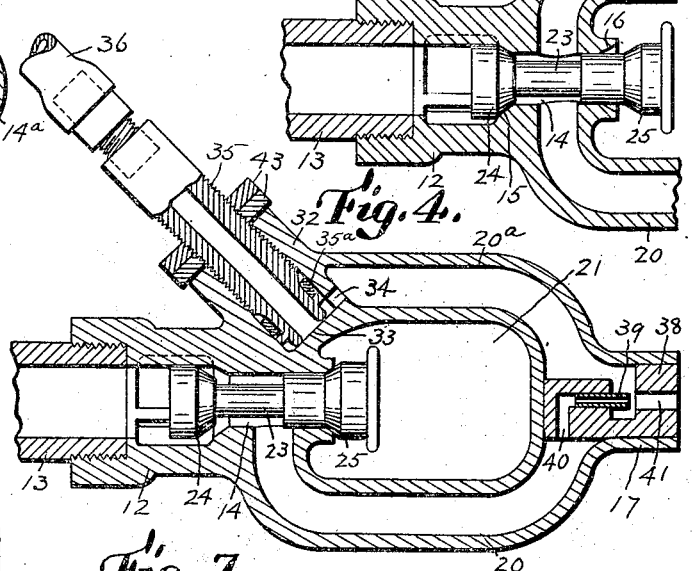
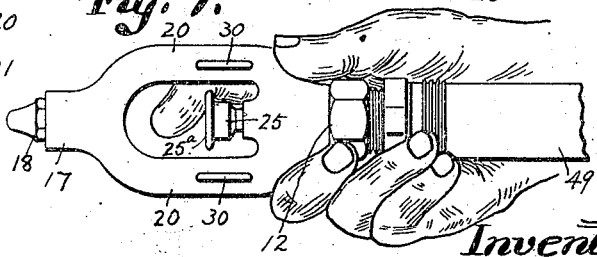
Inventor  
Charles O. Claflin  
Attys.

Patented Aug. 28, 1923.

1,466,119

UNITED STATES PATENT OFFICE.

CHARLES A. CLAFLIN, OF MEDFORD, MASSACHUSETTS.

CONDUIT MEMBER FOR CONDUCTING FLUID UNDER PRESSURE.

Application filed September 8, 1922. Serial No. 586,892.

*To all whom it may concern:*

Be it known that I, CHARLES A. CLAFLIN, a citizen of the United States, residing at Medford, in the county of Middlesex and State of Massachusetts, have invented new and useful Improvements in Conduit Members for Conducting Fluid Under Pressure, of which the following is a specification.

This invention relates generally to conduits for fluid under pressure, such as compressed air, and including a valved conduit member or section, the valve of which is adapted to be normally held closed by fluid pressure in the conduit, and opened by externally applied pressure.

The invention is embodied in the improvements hereinafter described and claimed, whereby said object is attained.

Of the accompanying drawings, forming a part of this specification,—

Figure 1 is a side view of a conduit member embodying the invention.

Figure 2 is a section on line 2—2 of Figure 1.

Figure 3 is a view similar to a portion of Figure 2, showing the valve stem and its valves in a different position.

Figure 4 is a view similar to Figure 2, showing a different embodiment of the invention.

Figure 5 is a section on line 5—5 of Figure 2.

Figure 6 is a view similar to Figure 2, showing the invention otherwise embodied.

Figure 7 is a side view, illustrating the manual control of the conduit member by the operator.

The same reference characters indicates the same parts in all the figures.

My improved conduit member comprises a casing including an inlet end portion 12, formed as a coupling part adapted to engage a complemental coupling part on a conduit member or section 13. Said end portion has a longitudinal bore 14, extending entirely through it, and provided with a rearwardly facing internal valve seat 15, and with a forwardly facing external valve seat 16, spaced from the seat 15.

The casing also includes an outlet end portion 17, to which a nipple 18 may be coupled, said outlet portion being substantially in alinement with the inlet portion. The outlet portion 17 is connected with and spaced from the inlet portion 12 by an intermediate portion communicating with the bore 14, between the valve seats 15 and 16, and communicating also with the outlet portion. Said intermediate portion is composed of two branches 20, arranged in the same plane, and offset oppositely from the longitudinal axis of the casing, the form and arrangement of said branches being such that an opening 21 is formed between the branches and between the end portions 12 and 17, as shown by Figure 2, said opening communicating with the external valve seat 16.

23 represents an elongated stem which is longitudinally movable in the bore 14, and is provided with an inner valve 24, adapted to be seated on the internal valve seat 15, by fluid pressure in the conduit to close the inlet end, as shown by Figure 3. The stem is also provided with an outer valve 25, located in the opening 21, and adapted to be seated on the external valve seat 16, as shown by Figure 2, by external pressure applied in the opening, as by a finger of the operator, to open the inlet end and prevent the escape of fluid into the opening. The valves 24 and 25 are so spaced apart that when either is closed on its seat, the other is opened.

The stem 23 is provided with an enlargement 27, which has a sliding fit in the outer portion of the bore 14, to prevent lateral displacement of the stem. A portion of the bore 14 is enlarged to permit fluid to flow when the inner valve 24 is opened, and provided with valve-guiding ribs 14$^a$.

The conduit member as described, is adapted for use as a nozzle, to cause a jet of compressed air to impinge on a surface acted on thereby, the conduit section 13 being flexible, or freely movable, so that the said nozzle may be grasped and moved about by one hand of the operator, to direct the jet as desired, the arrangement being such that a finger of the same hand may be inserted in the opening 21 and pressed against the outer valve 25, to hold the inner valve open. When the pressure is removed, the inner valve is closed by fluid pressure within the conduit, so that when the conduit member or nozzle is dropped, it becomes inoperative.

To prevent contact between the enlarged pressure receiving head 25$^a$ of the outer valve and a floor on which the member may be dropped, I provide the branches 20 with outwardly projecting ribs 30, arranged to protect said head as indicated by Figure 1.

Figure 4 shows one of the branches of the intermediate portion separated from the inlet end portion 12 by a partition 31, and adapted to conduct liquid to the outlet end portion 17, means being provided adjacent to the inlet end portion for admitting liquid to the said branch, which in this figure is designated 20ª.

The outlet end portion 17 is provided with means for subjecting liquid conducted by the branch 20ª to the atomizing action of air conducted by the other branch 20.

32 represents an internally threaded socket, formed on the outlet end portion 12, and provided with a flat seat 33, at its inner end, and with a contracted outlet 34, communicating with the branch 20ª. 35 represents a threaded nipple, coupled at one end to a liquid supply tube 36, and having an inner end face, adapted to be closed on the seat 33, to shut off the flow of liquid through the outlet 34, and to be separated to any extent desired from said seat, to permit a regulated flow. The nipple 35 is provided with an elastic packing ring 35ª to prevent leakage of air and liquid.

38 represents a plug secured in the outlet portion 17, and provided with a contracted nozzle 39, communicating through a passage 40 with the air-conducting branch 20. The plug is also provided with a discharge or outlet bore 41, which communicates both with the nozzle 39 and the branch 20ª. The arrangement is such that liquid conducted by the branch 20ª is atomized by air conducted by the branch 20 and nozzle 39, and discharged through the outlet 41 in the form of spray.

The nipple 35 may be secured at any desired adjustment by lock-nuts 43. The conduit member formed as described, to provide an opening 21 between an inlet and an outlet portion, may be used as an automatic drain valve, as shown by Figure 6, the inlet portion 12 being coupled to a fixed conduit member 44, and the valves 24 and 25 being acted on by a spring 46 housed in the opening 21, and acting to normally hold the valve 25 closed, and the valve 24 open, the tension of the spring being such that it is adapted to yield to fluid pressure, tending to close the valve 24.

The conduit member 44 may be a branch of a pipe line conducting steam, for example, to a nozzle, whereby the steam is discharged into boiler tubes to remove soot therefrom, the member 44 being arranged to receive water of condensation accumulating in the pipe line when the blower is not in use. The force of the spring is such that when there is no steam pressure in the pipe line, the outer valve 25 is held closed, and the inner valve 24 is held open by the spring, so that the water escapes through the outlet portion 17, and through a waste pipe 48. When steam is admitted to the pipe line, the inner valve 24 is closed by the steam pressure. The opening 21 in this, as well as in the previously described embodiments of the invention, permits the application of pressure to the stem 23 and its valves, at a point outside the bore or conducting portion of the conduit member, so that in an automatic drain valve, the spring 46 is readily accessible for removal and replacement, and is not subjected to contact with the conducted fluid.

When the conduit member is movable by the hand of the operator, its inlet end portion is coupled to a section of flexible hose 49, and the member is grasped by one hand, the fore finger of which is inserted in the opening 21, and bears on the outer head 25ª as shown by Figure 7. The stem 23 and its valves are freely rotatable to distribute the wear of the valves 24 and 25 and their seats. The stem is coaxial with the inlet portion 12, so that the fluid pressure on the valve 24 moves the stem and valves endwise and effectively closes the valve 24.

I claim:

1. A valved conduit member composed of a casing comprising an inlet end portion formed as a coupling part, adapted to engage a complemental part on another conduit member, said end portion having a longitudinal bore extending through it, and provided with a rearwardly facing internal valve seat, and a forwardly facing external valve seat, spaced from the internal seat, an outlet end portion spaced from and substantially in alinement with the inlet end portion, and an intermediate portion communicating with the bore of the inlet portion between said valve seats, and with the outlet portion, said intermediate portion including two branches, arranged in the same plane, and offset oppositely from the axis of the casing, so that an opening is provided between said end portions communicating with the said external valve seat; and a stem movable longitudinally in said bore and provided with an inner valve, adapted to be seated on the internal valve seat by fluid pressure, to close the inlet end, and with an outer valve located in said opening, and adapted to be seated on the external valve seat by pressure exerted within said opening, to open the inlet end and prevent the escape of fluid into the opening, the said valves being so spaced apart that when either is opened, the other is closed, the said opening being formed to receive the said outer valve and permit the application of pressure thereto, to close the outer and open the inner valve.

2. A valved conduit member substantially as specified by claim 1, the branches of the intermediate portion being provided with guard ribs formed and arranged to protect the head of the outer valve.

3. A valve conduit substantially as specified by claim 1, one of the branches of said intermediate portion being separated by a partition from the said inlet end portion, and adapted to conduct liquid to the said outlet end portion, means being provided adjacent to the inlet end portion for admitting liquid to the liquid-conducting branch, the outlet end portion being provided with means for subjecting liquid conducted by said branch to the atomizing action of air conducted by the other branch.

4. A valved conduit substantially as specified by claim 1, one of the branches of said intermediate portion being separated by a partition from the said inlet end portion, and adapted to conduct liquid to the said outlet end portion, said liquid-conducting branch having an internally threaded socket adjacent to the inlet end portion, and provided with a seat at its inner end, a contracted lateral outlet communicating with the said branch, and a threaded nipple engaged with said socket, and having an inner end face adapted to be closed on said seat, to shut off and regulate the flow of liquid, the outlet end portion being provided with a plug having means for subjecting liquid conducted by said branch to the atomizing action of air conducted by the other branch.

In testimony whereof I have affixed my signature.

CHARLES A. CLAFLIN.